US010533651B2

United States Patent
Suzumura et al.

(10) Patent No.: US 10,533,651 B2
(45) Date of Patent: Jan. 14, 2020

(54) GAP ADJUSTMENT MEMBER, METHOD TO ASSEMBLE GAP ADJUSTMENT MEMBER, AND TRANSMISSION

(71) Applicant: Aichi Machine Industry Co., Ltd., Nagoya-shi, Aichi (JP)

(72) Inventors: Yasushi Suzumura, Nagoya (JP); Takayuki Nakashima, Nagoya (JP); Hitoshi Oya, Nagoya (JP); Toshitaka Tsuji, Ama (JP); Hiromasa Kondo, Nagoya (JP)

(73) Assignee: Aichi Machine Industry, Co., Ltd., Nagoya (JP)

( * ) Notice: Subject to any disclaimer, the term of this patent is extended or adjusted under 35 U.S.C. 154(b) by 115 days.

(21) Appl. No.: 15/074,096

(22) Filed: Mar. 18, 2016

(65) Prior Publication Data
US 2016/0334003 A1 Nov. 17, 2016

(30) Foreign Application Priority Data
May 14, 2015 (JP) .................................. 2015-098733

(51) Int. Cl.
*F16H 57/04* (2010.01)
*F16H 57/022* (2012.01)

(52) U.S. Cl.
CPC ....... *F16H 57/022* (2013.01); *F16H 57/0471* (2013.01); *F16H 2057/0221* (2013.01); *F16H 2057/0227* (2013.01)

(58) Field of Classification Search
CPC ............... F16H 57/022; F16H 57/0471; F16H 2057/0221; F16H 2057/0225;
(Continued)

(56) References Cited

U.S. PATENT DOCUMENTS 2,544,631 A * 3/1951 Brozek .................... F16B 21/18
411/518
5,046,870 A 9/1991 Ordo
(Continued)

FOREIGN PATENT DOCUMENTS

DE 3825456 A1 * 2/1989 ............ F16C 19/386
DE 102011003766 A1 * 8/2011 .............. F16B 21/18
(Continued)

OTHER PUBLICATIONS

The Extended Search Report in the corresponding European Patent Application No. 16166505.4 dated Feb. 17, 2017.

*Primary Examiner* — Daniel D Yabut
(74) *Attorney, Agent, or Firm* — Global IP Counselors, LLP

(57) ABSTRACT

A gap adjustment member includes a main body and an outward protrusion. The main body portion has a diameter less than or equal to the diameter of a mounting hole. The outward protrusion protrudes outwardly on an outer perimeter surface of the main body portion, the number of the protrusions being less than or equal to the number of recessed grooves. A diameter of a circumscribing circle, which circumscribes the main body portion and passes a projecting end of the protrusion, and a crossing point, in which a line that passes the projecting end and a center of the main body portion intersects the outer perimeter surface of the main body portion, and which is a crossing point on the opposite side of the projecting end, is configured to be greater than the diameter of the mounting hole and less than or equal to the diameter of an annular groove.

18 Claims, 12 Drawing Sheets

(58) Field of Classification Search
CPC ... F16H 2057/0227; F16H 2057/02021; F16C 25/083; F16C 25/08; F16C 35/067; F16C 35/07; F16C 35/077; F16C 35/073; F16D 1/08; B23B 29/22; F16B 43/003; F16B 43/009; F16B 21/20; F16B 21/02; F16B 13/001
See application file for complete search history.

(56) References Cited

U.S. PATENT DOCUMENTS

| | | | | |
|---|---|---|---|---|
| 8,303,188 | B2 * | 11/2012 | Otsuka | F16C 25/083 |
| | | | | 384/537 |
| 8,475,320 | B2 * | 7/2013 | Kwon | F16H 48/40 |
| | | | | 384/517 |
| 8,844,483 | B2 * | 9/2014 | Ottersbach | F16B 21/18 |
| | | | | 123/90.15 |

FOREIGN PATENT DOCUMENTS

| | | | | |
|---|---|---|---|---|
| DE | 102013220834 A1 | | 6/2014 | |
| EP | 1400713 A2 * | | 3/2004 | ............ F16C 35/077 |
| JP | S61-096019 U1 | | 6/1986 | |
| JP | H03-020578 Y | | 5/1991 | |
| JP | 2002327740 A * | | 11/2002 | ............ F04B 1/0404 |
| JP | 2008271747 A * | | 11/2008 | ............ F16C 25/083 |
| JP | 2010-203581 A | | 9/2010 | |

\* cited by examiner

GAP ADJUSTMENT MEMBER, METHOD TO ASSEMBLE GAP ADJUSTMENT MEMBER, AND TRANSMISSION

CROSS-REFERENCE TO RELATED APPLICATIONS

This application claims priority to Japanese Application No. 2015-098733, filed May 14, 2016, the contents of each of which is hereby incorporation herein by reference.

BACKGROUND

Field of Invention

The present invention relates to a gap adjustment member disposed between a first member and a second member for adjusting the gap between the first member and the second member.

Background Information

Japanese examined utility model application publication No. Hei 3[1991]-20578 discloses a gap adjustment member that is disposed between the bottom surface of a mounting hole of an impeller and an end surface of a drive shaft, to adjust the relative position between the impeller and the drive shaft, which is inserted in a mounting hole of the impeller.

The gap adjustment member disclosed in Japanese examined utility model application publication No. Hei 3[1991]-20578 includes four protrusions that protrude radially outward on the outer perimeter surface thereof. The diameter of a virtual circle that connects the projecting ends of the four protrusions is smaller than the diameter of an annular groove for attaching the gap adjustment member of the impeller, and larger than the diameter of the mounting hole of the impeller. The generation of an axis misalignment between the center of the drive shaft and the center of the inner hole of the gap adjustment member, which is caused by the gap adjustment member falling into the annular groove, is thereby suppressed.

SUMMARY

However, upon mounting the gap adjustment member to the annular groove of the impeller described above, it is necessary to carry out the mounting by inserting one of the four protrusions into a one keyway that is formed in the mounting hole of the impeller while the gap adjustment member is inclined obliquely with respect to the mounting hole; therefore, there is room for improvement in terms of assembly properties. Further, since axis misalignment between the center of the drive shaft and the center of the inner hole of the gap adjustment member cannot be completely suppressed, it is necessary to set the inner hole diameter of the gap adjustment member to a size that anticipates the generation of the axis misalignment, which leads to a decrease in the contact area between the gap adjustment member and the end surface of the drive shaft.

The present invention was made in light of the above, and an object thereof is to provide a technique that contributes to an improvement in the assembly properties.

The gap adjustment member of the present invention employs the following to achieve the object described above.

According to a preferred embodiment of the gap adjustment member of the present invention, the gap adjustment member is disposed between a first member having a mounting hole, an annular groove, and a recessed groove, and a second member configured to be mounted to the mounting hole, and is configured to be inserted in the mounting hole and disposed in the annular groove, to adjust the gap between the first member and the second member. The annular groove is configured to be concentric with the mounting hole and to have a diameter that is larger than the diameter of the mounting hole, at the bottom portion of the mounting hole. The recessed groove is recessed toward the radially outward direction of the mounting hole, and configured to extend from the opening of the mounting hole to the annular groove. The gap adjustment member comprises a main body portion configured to have a diameter that is less than or equal to the diameter of the mounting hole, and an outward protrusion formed to protrude radially outwardly on the outer perimeter surface of the main body portion. At least one, and less than or equal to the number of the recessed grooves, of the outward protrusions are provided. Further, the diameter of a virtual circumscribing circle, which circumscribes the main body portion and passes the projecting end of the outward protrusion, and a crossing point, in which a virtual line that passes the projecting end and the center of the main body portion intersects the outer perimeter surface of the main body portion, and which is a crossing point on the opposite side of the projecting end, is configured to be greater than the diameter of the mounting hole and less than or equal to the diameter of the annular groove.

Other than a member that is used for the purpose of literally adjusting the size of the gap between a first member and a second member, the "gap adjustment member" in the present invention suitably includes a member that is used for the purpose of adjusting the relative position between a first member and a second member; typically, a shim corresponds to this member. While a keyway, for inserting a key, for keying the attachment between a first member and a second member, or a lubrication groove for circulating lubricating oil, typically correspond thereto, the "recessed groove" in the present invention suitably includes a dedicated groove provided only for inserting the outward protrusion of the gap adjustment member. Further, "radially outward" in the present invention is defined as a direction along the radial direction of the mounting hole and a direction away from the center of the mounting hole. Additionally, as an embodiment in which "at least one, and less than or equal to the number of the recessed grooves, of the outward protrusions are provided" in the present invention, typically, a corresponding embodiment is one in which the same number of outward protrusions are respectively disposed in positions that correspond to the recessed grooves on the outer perimeter surface of the main body portion, so as to correspond to the recessed grooves.

The present invention is configured so that at least one, and less than or equal to the number of the recessed grooves of the outward protrusions are provided; therefore, when inserting a gap adjustment member into the mounting hole, it is not necessary to obliquely incline the gap adjustment member with respect to the opening of the mounting hole, by aligning the outward protrusions with the recessed grooves. The assembly properties of the gap adjustment member are thereby improved. In a case in which the gap adjustment member is assembled to the annular groove in a state in which the opening of the mounting hole is facing vertically downward, when the gap adjustment member is disposed in the annular groove, falling of the gap adjustment member can be successfully prevented by rotating the gap adjustment member to a position in which the outward protrusions and the recessed grooves are not aligned.

According to a further embodiment of the gap adjustment member according to the present invention, the main body portion is formed in a ring shape having an inner hole. The inner hole is formed to have a center in a position that is shifted in the projecting direction of the outward protrusion with respect to the center of the main body portion.

According to the present embodiment, since the center of the inner hole is configured to be disposed in a position that is shifted toward the projecting direction of the outward protrusion with respect to the center of the main body portion, the displacement of the center of the inner hole with respect to the center of the annular groove is corrected, when the gap adjustment member is engaged with the annular gap so that the outward protrusion is disposed in the annular gap. The displacement of the center of the inner hole of the gap adjustment member with respect to the center of the mounting hole after assembly can thereby be suppressed. As a result, it is possible to successfully prevent a reduction in the contact area between the main body portion and the first and second members. In a case in which the gap adjustment member is assembled to the annular groove in a state in which the opening of the mounting hole is oriented vertically, falling of the gap adjustment member can be successfully prevented, since the outward protrusion and the portion of the main body portion that opposes the outward protrusion are engaged with the annular gap.

According to a further embodiment of the gap adjustment member according to the present invention, the diameter of the virtual circumscribing circle is configured to be the same size as the diameter of the annular groove. The displacement amount of the center of the inner hole with respect to the center of the main body portion is set to be the same size as the displacement amount of the center of the virtual circumscribing circle with respect to the center of the annular groove, when the center of the main body portion and the center of the annular groove are aligned.

"Same size" in the present invention is not limited to an embodiment in which the size is literally configured to be the same, but suitably includes embodiments in which the size is configured or set to be substantially the same.

According to the present embodiment, the orientation and the amount of the displacement of the center of the inner hole with respect to the center of the main body portion are configured so that the phase differs by 180 degrees with respect to the direction of the movement of the gap adjustment member in the radial direction, which is generated when engaging the outward protrusion and the annular gap, as well as so that the displacement amount will be the same; therefore, the displacement amount of the center of the inner hole with respect to the center of the mounting hole can be effectively prevented when the gap adjustment member is assembled to the annular groove.

According to a further embodiment of the gap adjustment member according to the present invention, an inward protrusion formed to protrude radially inwardly is provided to the inner hole. "Radially inward" in the present invention is defined as a direction along the radial direction of the mounting hole and a direction toward the center of the mounting hole.

According to the present embodiment, in a configuration in which the attachment of the gap adjustment member to the annular groove is carried out by inserting the gap adjustment member in the mounting hole in a state in which the outward protrusion is inserted in the recessed groove and rotating the gap adjustment member within the annular groove in the circumferential direction of the annular groove to engage the outward protrusion with the annular groove when the gap adjustment member reaches the annular groove, the gap adjustment member can be rotated using the inward protrusion. The assembly properties of the gap adjustment member to the annular groove are thereby improved.

According to a further embodiment of the gap adjustment member according to the present invention, the inner hole protrusion is provided to at least one of the inner perimeter surface of an inner hole corresponding to a first position on the outer perimeter surface of the main body portion to which the outward protrusion is disposed, and the inner perimeter surface of an inner hole corresponding to a second position on the outer perimeter surface of the main body portion, with a phase that is shifted 180 degrees with respect to the first position.

According to the present embodiment, when it is necessary to make an adjustment so that the outward protrusion is disposed in an appropriate position in the circumferential direction of the annular groove, the inward protrusion can be utilized as a marker to check the position of the outward protrusion in the circumferential direction.

According to a preferred embodiment of the method to assemble a gap adjustment member of the present invention, a method to assemble a gap adjustment member is configured, wherein a gap adjustment member, which is interposed between a first member having a mounting hole, an annular groove, and a recessed groove, and a second member configured to be mounted to the mounting hole, in order to adjust the gap between the first member and the second member, is assembled to an annular groove. The annular groove is configured to be concentric with the mounting hole and to have a diameter that is larger than the diameter of the mounting hole, at the bottom portion of the mounting hole. Further, the recessed groove is recessed toward the radially outward direction of the mounting hole, and configured to extend from the opening of the mounting hole to the annular groove. In said assembly method, the gap adjustment member of the present invention according to any one of the above-described embodiments is inserted in the mounting hole, in a state in which the outward protrusion is inserted in the recessed groove. Then, when the gap adjustment member reaches the annular groove, the gap adjustment member is engaged with and assembled to the annular groove by rotating the gap adjustment member within the annular groove in the circumferential direction of the annular groove.

According to the present invention, since the gap adjustment member of the present invention according to any one of the above-described embodiments is assembled to the annular groove, the same effects as the effects that are exerted by the gap adjustment member of the present invention can be exerted; for example, the assembly properties of the gap adjustment member can be improved, and the displacement of the center of the inner hole of the gap adjustment member with respect to the center of the mounting hole after assembly can be suppressed.

According to a further embodiment of a method to assemble the gap adjustment member according to the present invention, the gap adjustment member is rotated within the annular groove in the circumferential direction of the annular groove, until the outward protrusion is disposed in a position with a phase that is shifted 180 degrees from the position to which the recessed groove is disposed.

According to the present embodiment, since the outward protrusion is disposed in a position that is farthest apart from the recessed groove in a state in which the gap adjustment member is assembled to the annular groove, it is possible to effectively suppress the outward protrusion and the recessed groove from being aligned due to an unintended rotation of the gap adjustment member, causing the gap adjustment member to fall off from the mounting hole, upon assembling the second member to the first member.

According to a preferred embodiment of the transmission device of the present invention, a transmission device is configured comprising a case, an axle bearing member that is attached to the case, and a rotational shaft that is rotatably supported to the case via the axle bearing member. The case is provided with a mounting hole, an annular groove, and a recessed groove. The mounting hole is configured to attach the axle bearing member. The annular groove is configured to be coaxial with the mounting hole and to have a diameter that is larger than the diameter of the mounting hole, at the bottom portion of the mounting hole. Further, the recessed groove is recessed toward the radially outward direction of the mounting hole, and configured to extend from the opening of the mounting hole to the annular groove. Then, the gap between the case and the axle bearing member is configured to be adjusted by assembling the gap adjustment member of the present invention according to any one of the above-described embodiments to the annular groove.

According to the present invention, since the gap adjustment member of the present invention according to any one of the above-described embodiments is provided, the same effects that are exerted by the gap adjustment member of the present invention can be exerted; for example, the assembly properties of the gap adjustment member can be improved, and the displacement of the center of the inner hole of the gap adjustment member with respect to the center of the mounting hole after assembly can be suppressed.

According to a further embodiment of the transmission device according to the present invention, the recessed groove is configured as a lubricating oil passage for supplying lubricating oil between the axle bearing member and the case.

The present embodiment is logical, since the embodiment is a configuration in which a lubricating oil passage for supplying lubricating oil between the axle bearing member and the case is utilized as a recessed groove for inserting the outward protrusion of the gap adjustment member.

The present invention is capable of providing a technique that contributes to an improvement in the assembly properties and to prevent a displacement of the center of the inner hole of the gap adjustment member with respect to the center of the mounting hole after assembly.

BRIEF DESCRIPTION OF THE DRAWINGS

FIG. 3 is a cross-sectional view when sectioning the mounting hole 22a by a plane that is perpendicular to the center axis line of the mounting hole 22a.

FIG. 4 is an enlarged cross-sectional perspective view showing the cross section when sectioning the mounting portion 22 by a plane that includes the center axis line of the mounting hole 22a.

FIG. 6 is a cross-sectional view when sectioning the mounting hole 24a by a plane that is perpendicular to the center axis line of the mounting hole 24a.

FIG. 7 is an enlarged cross-sectional perspective view showing the cross section when sectioning the mounting portion 24 by a plane that includes the center axis line of the mounting hole 24a.

FIG. 9 is an explanatory view showing a state when inserting the shim 30 in the mounting hole 22a.

FIG. 10 is an explanatory view showing a state when the shim 30 is seated on the bottom portion 22a' of the mounting hole 22a.

DETAILED DESCRIPTION OF THE EMBODIMENTS

Next, the optimal configuration for executing the present invention will be described using embodiments.

Embodiments

Figure 1:
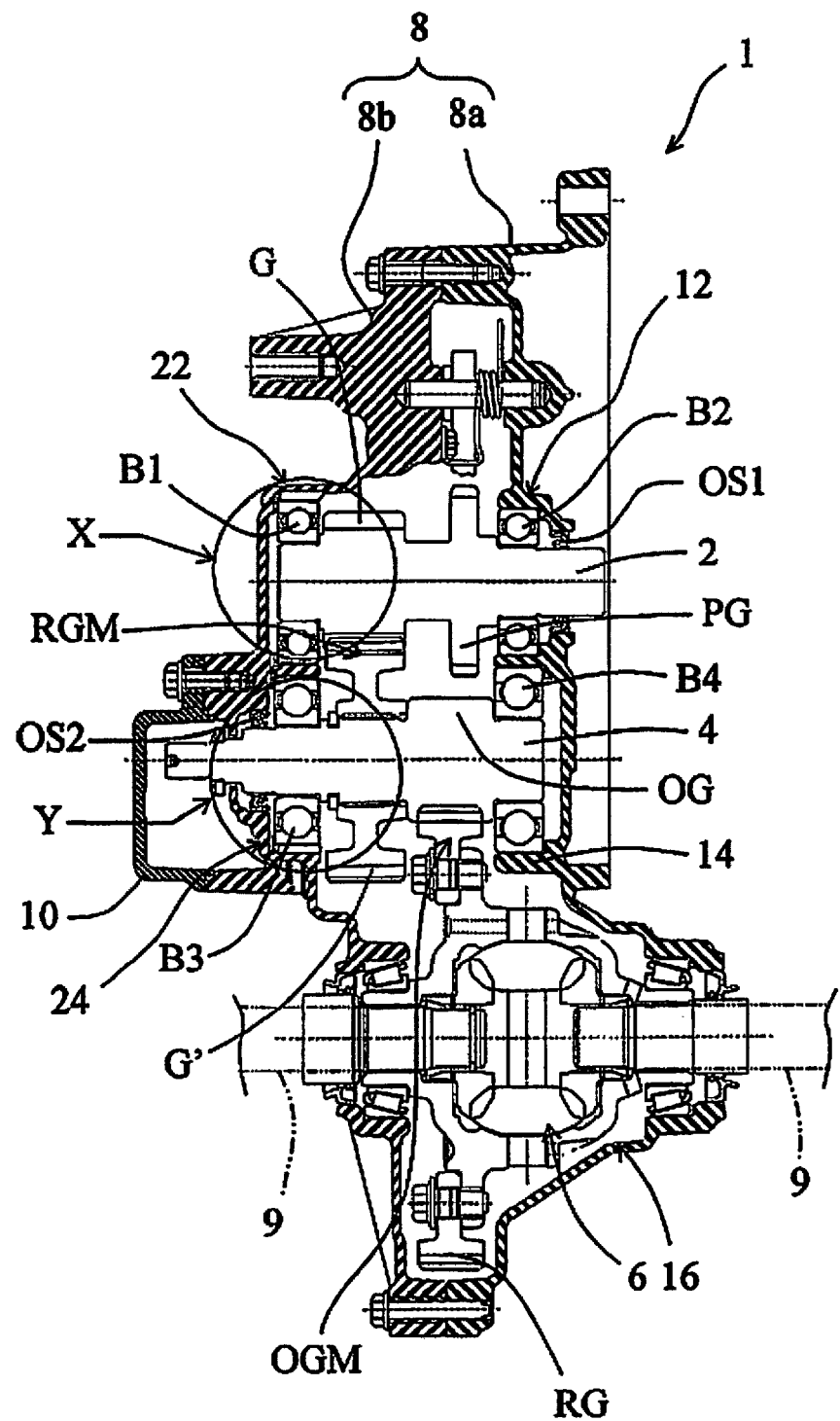
FIG. 1 is a cross-section diagram schematically showing a configuration of a decelerator 1 according to an embodiment of the present invention.

As shown in FIG. 1, the decelerator 1 according to an embodiment of the present invention comprises an input shaft 2 which is connected to a rotational shaft (not shown) of a motor (not shown), an output shaft 4 which is connected to the input shaft 2 via a reduction gear mechanism RGM, a differential 6 which is connected to the output shaft 4 via an output gear mechanism OGM, and a decelerator case 8 which houses the above. The decelerator 1 is one example of an implementation that corresponds to the "transmission device" of the present invention.

As shown in FIG. 1, the input shaft 2 is rotatably supported to the decelerator case 8 via bearings B1, B2. A drive gear G and a parking gear PG are integrally formed in the input shaft 2. The drive gear G and the parking gear PG are arranged in the input shaft 2 in the order of the parking gear PG, then the drive gear G, from the side of the input shaft 2 to be connected to the rotational shaft of the motor (right side of the sheet in FIG. 1).

The end on the side of the input shaft 2 to be connected to the rotational shaft of the motor (right side end in FIG. 1) protrudes from the decelerator case 8 sealed separate by an oil seal OS1. The input shaft 2 is one example of an implementation that corresponds to the "rotational shaft" of the present invention.

As shown in FIG. 1, the output shaft 4 is arranged parallel to the input shaft 2. The output shaft 4 is rotatably supported to the decelerator case 8 via bearings B3, B4. A driven gear G' configured to mesh with the drive gear G is fixed to, and an output gear OG is integrally formed in, the output shaft 4.

The driven gear G' and the output gear OG are arranged in the output shaft 4 in the order of the output gear OG, then the driven gear G', from the right side of the sheet in FIG. 1. The driven gear G' is fixed to the output shaft 4 so as to be integrally rotatable with the output shaft 4 by spline fitting or the like. The driven gear G' is configured to have a larger outer diameter, and more number of teeth, than the drive gear G. That is, the driven gear G' is configured to decelerate the rotation speed of the input shaft 2 and transmit the same to the output shaft 4. The reduction gear mechanism RGM is configured by the drive gear G and the driven gear G'.

The end of the output shaft 4 on the left side of the sheet in FIG. 1 protrudes from the decelerator case 8 sealed separate by an oil seal OS2, and is covered by a cover 10 that is mounted to the decelerator case 8. The output shaft 4 is one example of an implementation that corresponds to the "rotational shaft" of the present invention.

As shown in FIG. 1, the differential 6 is configured to absorb a speed difference (rotational frequency difference) that is generated between the left and right axles 9, 9, while distributing and transmitting power. The differential 6 comprises a ring gear RG that is configured to mesh with the output gear OG. The ring gear RG is configured to have a larger outer diameter, and more number of teeth, than the output gear OG. That is, the ring gear is configured to decelerate the rotation speed of the output shaft 4 and transmit the same to the axles 9, 9. The output gear mechanism OGM is configured by the output gear OG and the ring gear RG.

As shown in FIG. 1, the decelerator case 8 comprises a housing unit 8a and a case main body portion 8b which is connected to the housing portion 8a. The decelerator case 8 is one example of an implementation that corresponds to the "case" of the present invention.

As shown in FIG. 1, the housing unit 8a comprises mounting portions 12, 14 for mounting the bearings B2, B4, and a housing portion 16 for housing the differential 6.

Figure 2:
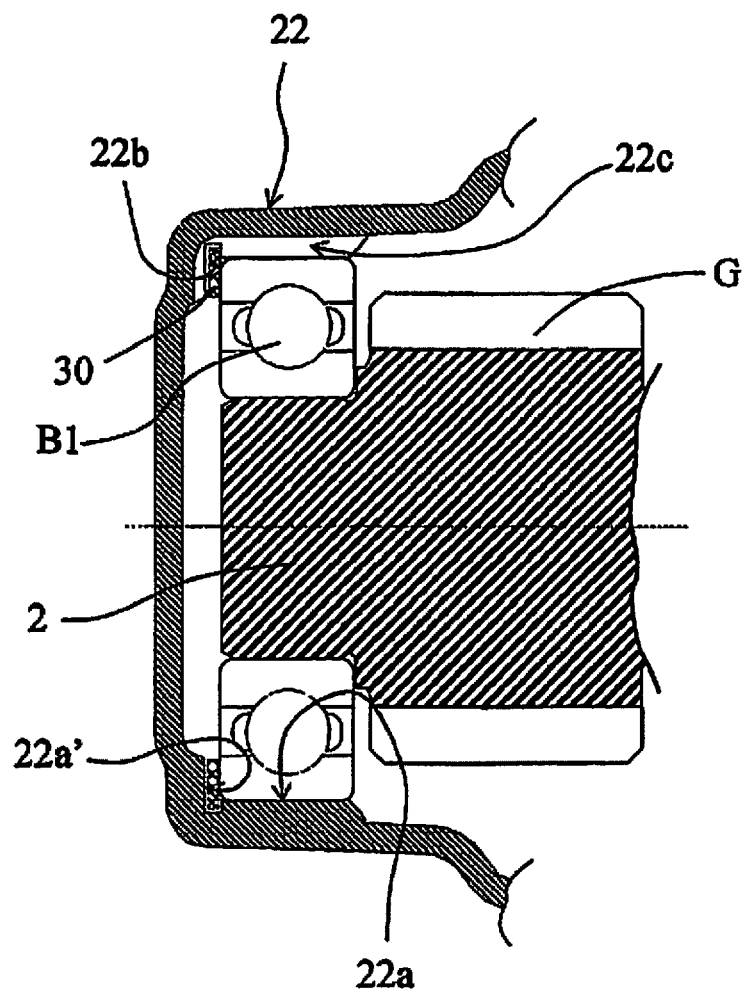
FIG. 2 is a main part enlarged view showing an enlarged X portion of FIG. 1.
Figure 3:
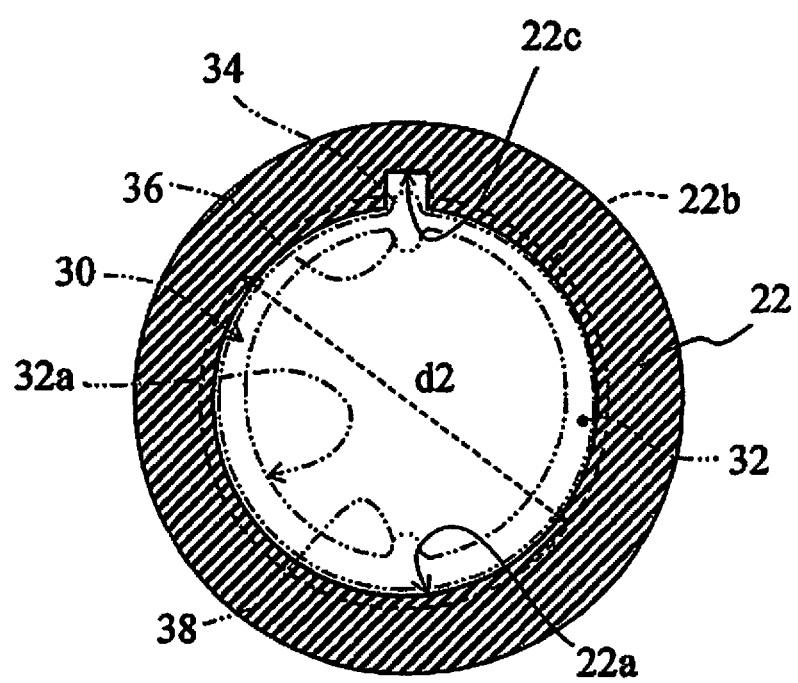
Figure 4:
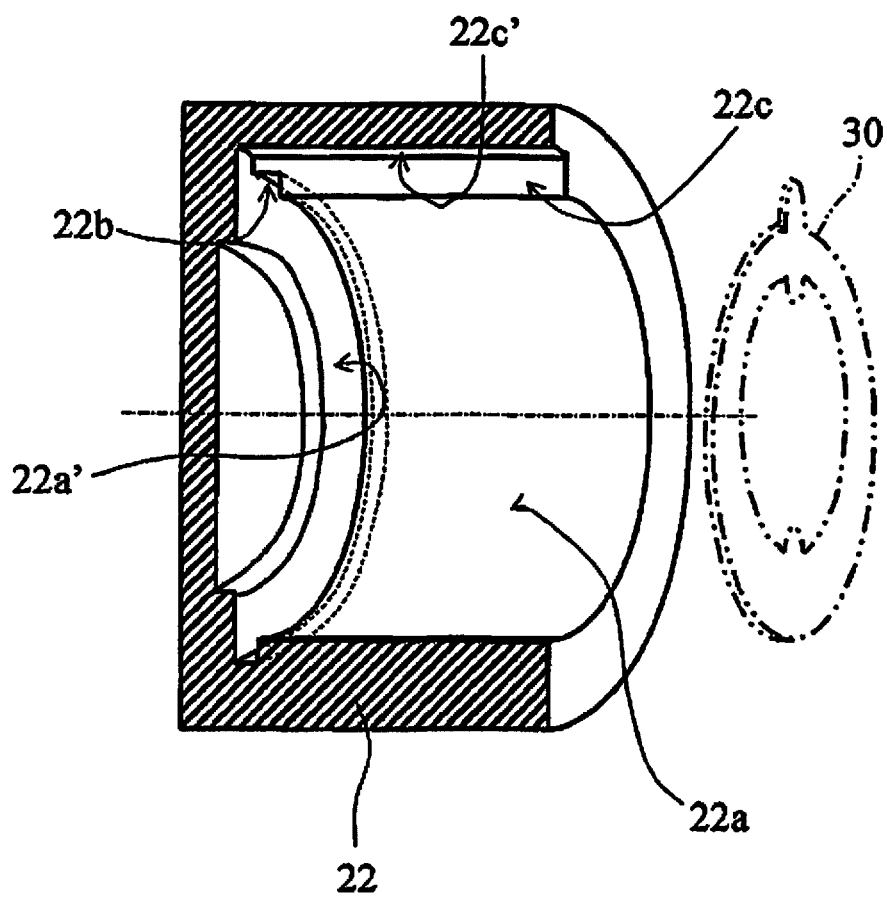
Figure 5:
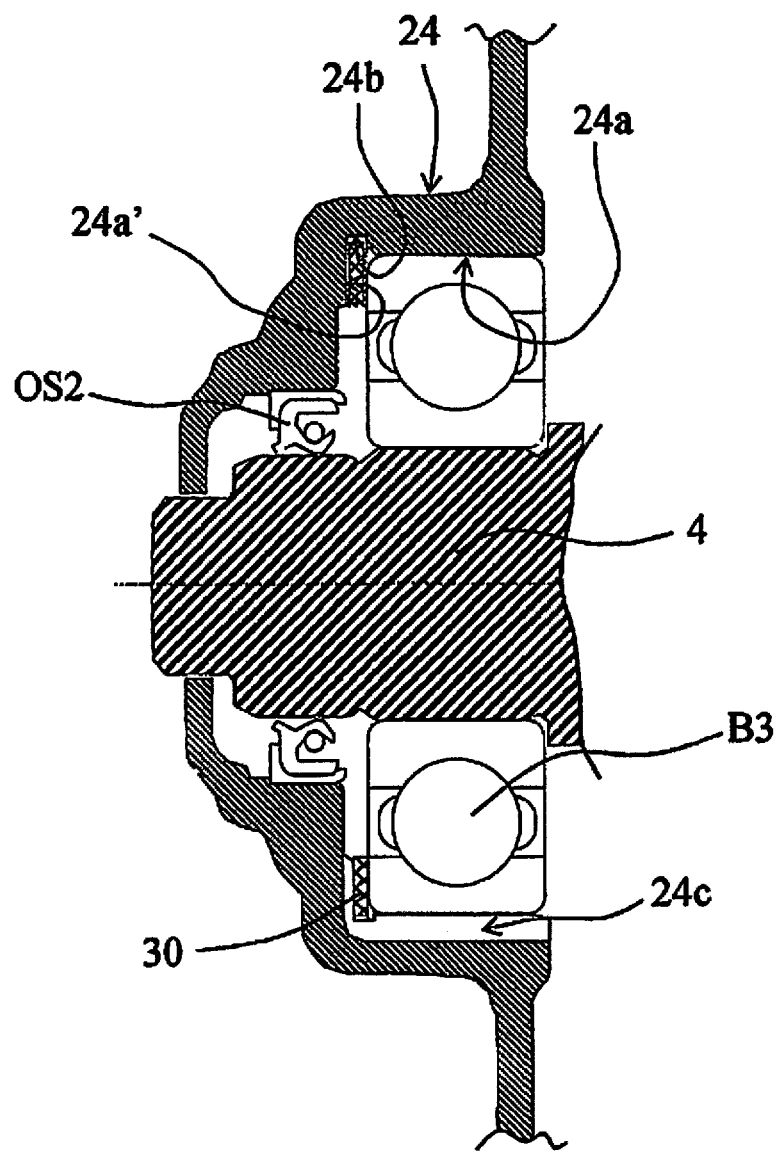
FIG. 5 is a main part enlarged view showing an enlarged Y portion of FIG. 1.
Figure 6:
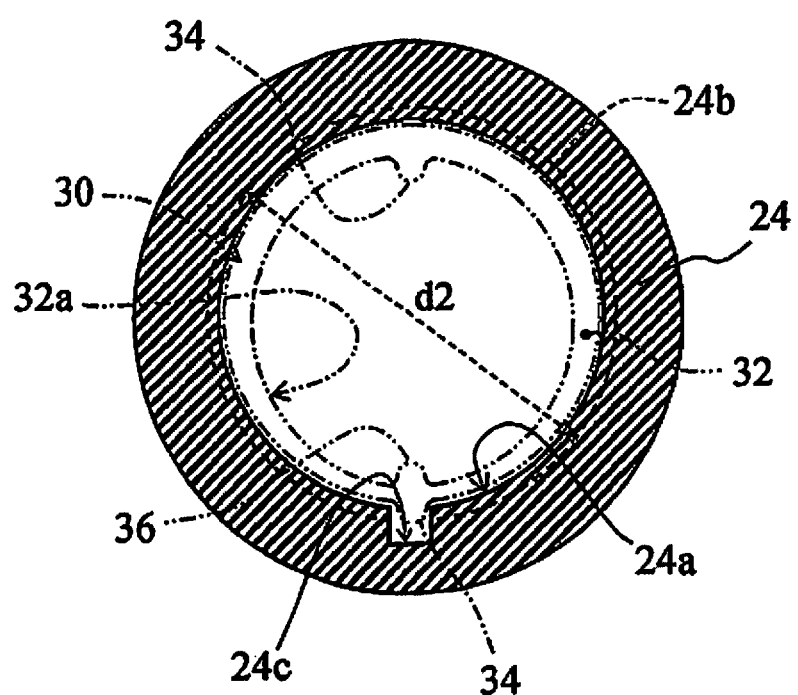
Figure 7:
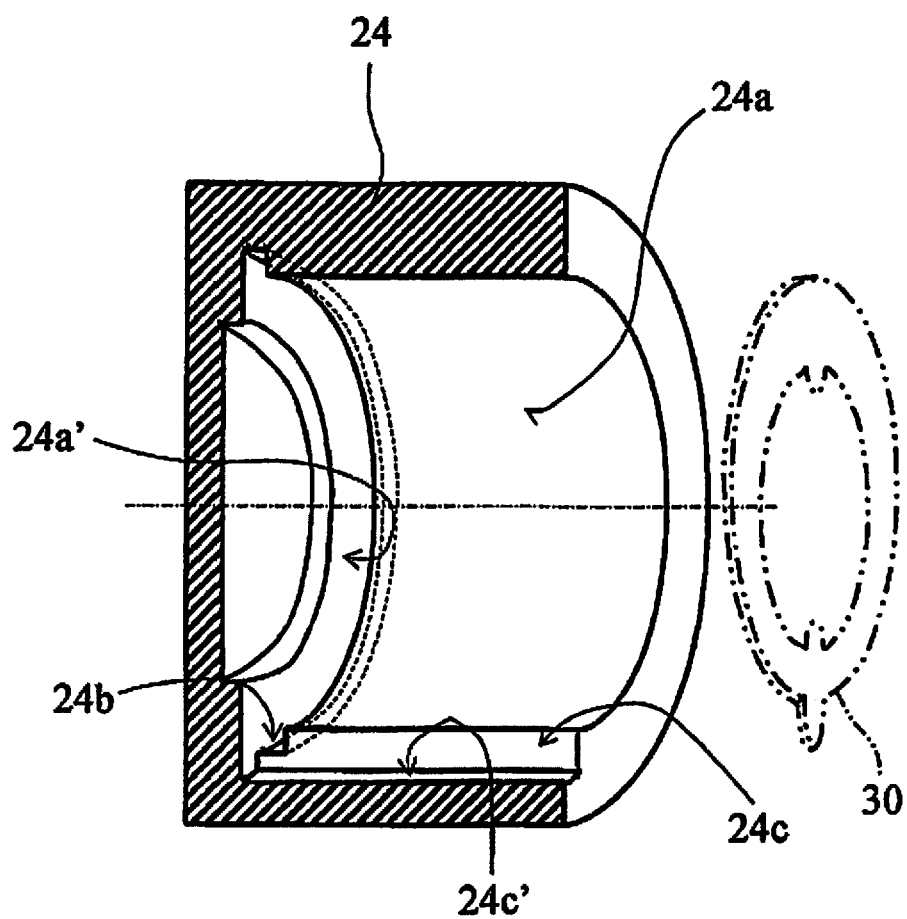

As shown in FIG. 1, the case main body portion 8b comprises mounting portions 22, 24 for mounting the bearings B1, B3. As shown in FIG. 2 to FIG. 4, a mounting hole 22a, an annular groove 22b, and a recessed groove 22c are formed in the mounting portion 22. Further, as shown in FIG. 5 to FIG. 7, a mounting hole 24a, an annular groove 24b, and a recessed groove 24c are formed in the mounting portion 24. The mounting portions 22, 24 are examples of implementations that correspond to the "first member" of the present invention.

As shown in FIG. 4 and FIG. 7, one end sides (right side in FIG. 4 and FIG. 7) of the mounting holes 22a, 24a are opened, while the other end sides (left side in FIG. 4 and FIG. 7) include bottom portions 22a', 24a'. The mounting holes 22a, 24a are configured to have the same or slightly larger diameters than the diameters of the bearings B1, B3. The bearings B1, B3 are examples of implementations that correspond to the "second member" of the present invention.

As shown in FIG. 4 and FIG. 7, the annular grooves 22b, 24b are configured to be concentric with the mounting holes 22a, 24a, as well as to have diameters that are larger than the diameters of the mounting holes 22a, 24a. The annular grooves 22b, 24b are arranged on the bottom portions 22a', 24a' of the mounting holes 22a, 24a. As shown in FIG. 2 and FIG. 5, the shim 30 is engaged with the annular grooves 22b, 24b.

That is, the axial end surfaces of the bearings B1, B3 are abutted with the bottom portions 22a', 24a' of the mounting holes 22a, 24a, via the shim 30. In this manner, by a configuration in which the shim 30 is interposed between the bottom portions 22a', 24a' of the mounting holes 22a, 24a and the axial end surfaces of the bearings B1, B3, the size of the gap between the bottom portions 22a', 24a' of the mounting holes 22a, 24a and the axial end surfaces of the bearings B1, B3 can be adjusted, and it is possible to achieve a relative positional adjustment of the input shaft 2 and the output shaft 4 in the axial direction with respect to the decelerator case 8.

As shown in FIG. 3, FIG. 4, FIG. 6, and FIG. 7, the recessed grooves 22c, 24c are disposed in the mounting holes 22a, 24a with a concave shape in the radial direction. As shown in FIG. 4 and FIG. 7, the recessed grooves 22c, 24c extend from the open ends of the mounting holes 22a, 24a over to the bottom portions 22a', 24a', and are connected to the annular grooves 22b, 24b on the bottom portion 22a', 24a' side. In the present embodiment, the recessed grooves 22c, 24c are configured as a lubricating groove for supplying lubricating oil that is stored in the decelerator case 8 to the lip portion of the oil seal OS2 and the shim 30. The recessed grooves 22c, 24c are configured so that the distance from the centers of the mounting holes 22a, 24a (annular grooves 22b, 24b) to the bottom surfaces 22c', 24c' of the recessed grooves 22c, 24c will be greater than the diameters of the annular grooves 22b, 24b (the distance from the centers of the annular grooves 22b, 24b to the bottom surfaces of the annular grooves 22b, 24b).

Figure 8:
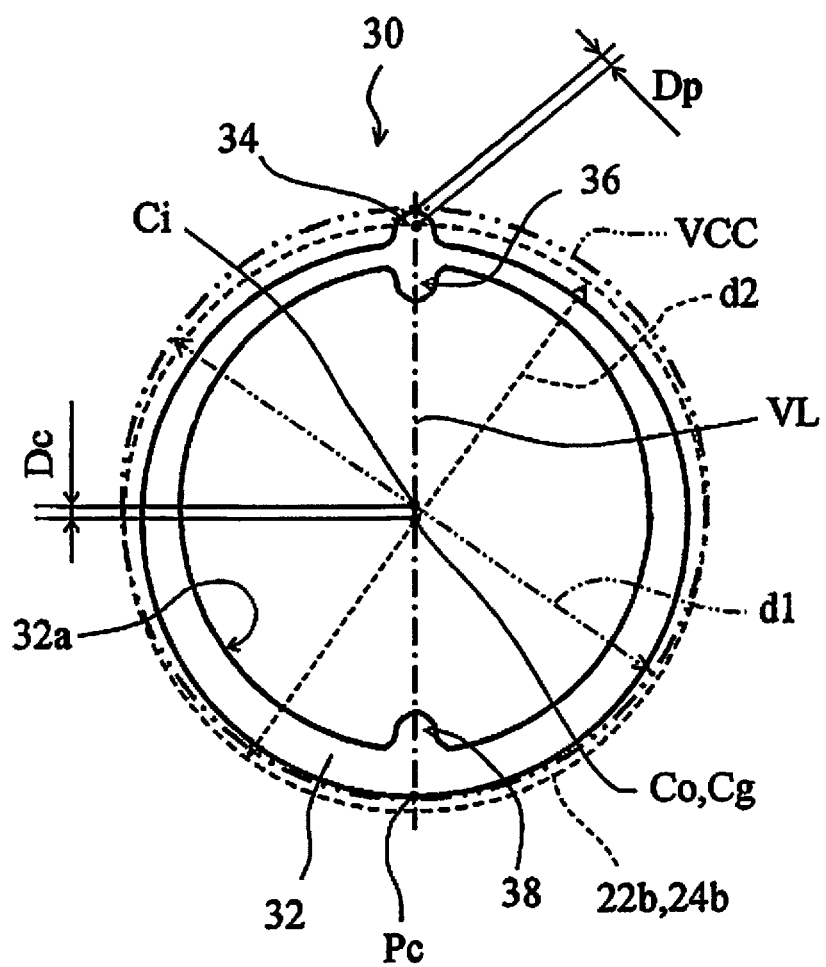
FIG. 8 is a plane view of the shim 30.

As shown in FIG. 8, the shim 30 is configured as an annular plate member. The shim 30 is mainly configured from a main body portion 32, an outward projection 34, and two inward projections 36, 38. The shim 30 is one example of an implementation that corresponds to the "gap adjustment member" of the present invention.

As shown in FIG. 3 and FIG. 6, the outer circle of the main body portion 32 is configured to have a diameter that is the same or slightly smaller than the diameter of the mounting holes 22a, 24a. Further, as shown in FIG. 8, an inner hole 32a of the main body portion 32 is configured to have a center Ci in a position that is shifted with respect to the center Co of the outer circle of the main body portion 32.

As shown in FIG. 8, the center Ci of the inner hole 32a is shifted in a direction that is on the outward projection 34 side with respect to the center Co of the outer circle of the main body portion 32, on a virtual line VL, which passes the center Co of the outer circle of the main body portion 32 and the projecting end of the outward projection 34.

Further, as shown in FIG. 8, the diameter d1 of a virtual circumscribing circle VCC, which circumscribes the main body portion 32, passes the projecting end of the outward projection 34, and a crossing point Pc, which is a crossing point between a virtual line VL and the outer circle of the main body portion 32 and which is on the opposite side of the outward projection 34, and which has the center on the virtual line VL, is configured to be greater than the diameter of the mounting holes 22a, 24a, and to be the same size as the diameter d2 of the bottom surfaces of the annular grooves 22b, 24b. The displacement amount Dc of the center Ci of the inner hole 32a with respect to the center Co of the outer circle of the main body portion 32 is set to be equal to the displacement amount Dp between the virtual circumscribing circle VCC and the annular grooves 22b, 24b, which is generated when aligning the center Co of the outer circle of the main body portion 32, and the center Cg of the mounting holes 22a, 24a and the annular grooves 22b, 24b.

As shown in FIG. 8, the outward projection 34 is disposed so as to protrude toward the radially outward direction from the outer perimeter surface of the main body portion 32. Here, radially outward is defined as a direction away from the center Co of the outer circle of the main body portion 32. The protrusion amount of the outward projection 34 from the outer perimeter surface of the main body portion 32 is set to a value with which the diameter d1 of the virtual circumscribing circle VCC becomes greater than the diameters of the mounting holes 22a, 24a, and becomes the same size as the diameter d2 of the annular grooves 22b, 24b, as described above. The outward projection 34 is one example of an implementation that corresponds to the "outward protrusion" of the present invention.

As shown in FIG. 8, the inward projection 36 is disposed in a position corresponding to the outward projection 34 on the circumference of the inner hole 32a. The inward projection 36 is disposed so as to protrude in the radially inward direction of the inner hole 32a, that is, toward the center Ci, from the inner perimeter surface of the inner hole 32a, along the virtual line VL.

As shown in FIG. 8, the inward projection 38 is disposed so as to protrude toward the radially inward direction of the inner hole 32a, in a position with a phase that is shifted 180 degrees with respect to the position on the circumference of the inner hole 32a in which the inward projection 36 is disposed, that is, in a position that corresponds to the directly opposite position of the inward projection 36. Therefore, the inward projection 36 is also disposed on the virtual line VL. The inward projections 36, 38 are examples of implementations that correspond to the "inward protrusion" of the present invention.

Next, a method to assemble the shim 30 configured in this manner to the annular groove 22b will be described. Since the method to assemble the shim 30 to the annular groove 24b is basically the same as the method to assemble the shim 30 to the annular groove 22b, the description thereof will be omitted.

Figure 9:
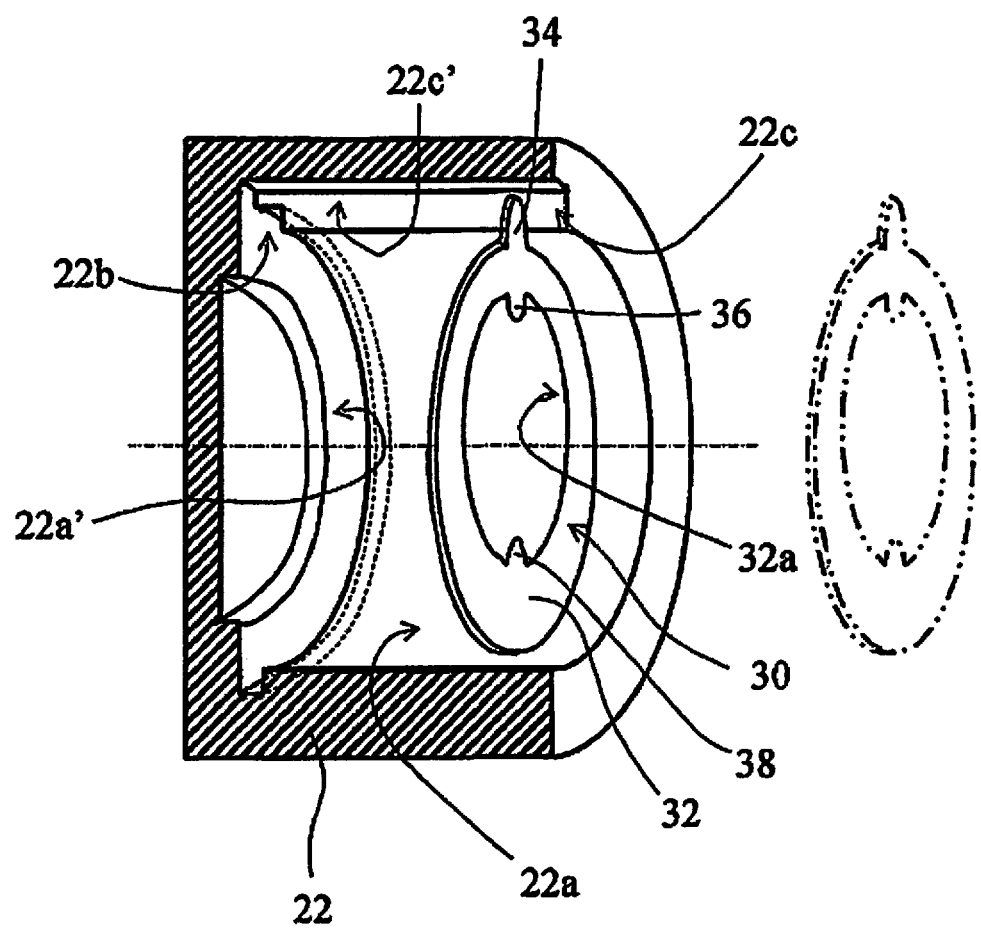
Figure 10:
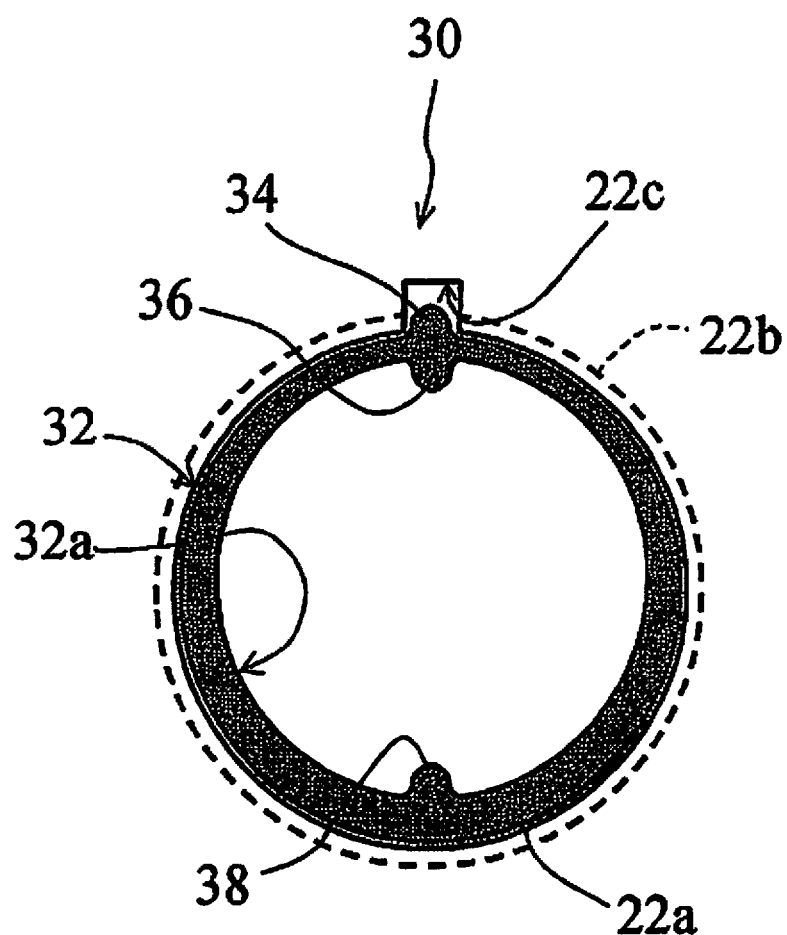

When assembling the shim 30 to the annular groove 22b, first, as shown in FIG. 9 and FIG. 10, in a state in which the outward projection 34 of the shim 30 is aligned with the recessed groove 22c of the mounting portion 22, and the center Co of the outer circle of the main body portion 32 is aligned with the center Cg of the mounting hole 22a and the annular groove 22b, the shim 30 is inserted inside the mounting hole 22a until seated on the bottom portion 22a' of the mounting hole 22a of the mounting portion 22. In this manner, since the present embodiment is configured so that the outward projection 34 is inserted in the recessed groove 22c, and so that the main body portion 32 has a diameter that is the same size as, or slightly smaller than, the diameter of the mounting hole 22a, the shim 30 can be inserted without being inclined with respect to the mounting hole 22a.

Figure 11:
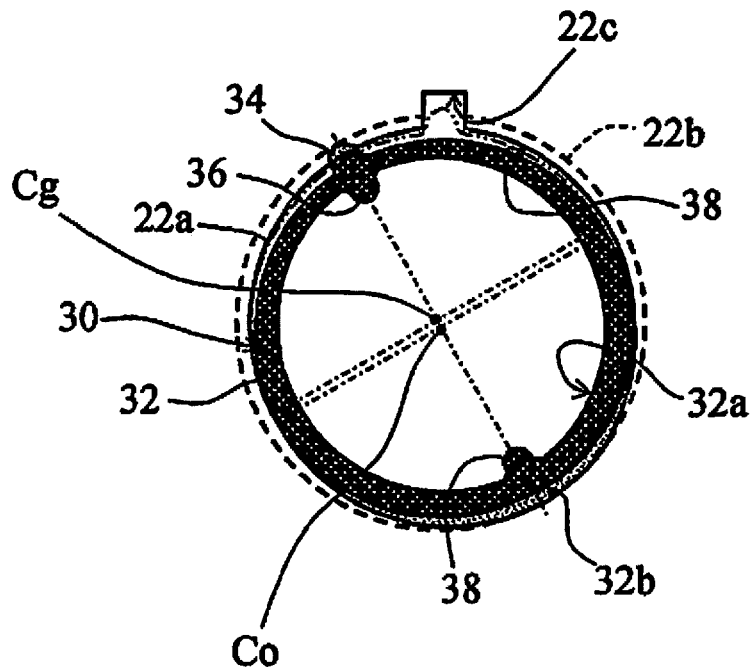
FIG. 11 is an explanatory view showing a state when rotating the shim 30 in the annular groove 22b.

When the shim 30 is seated on the bottom portion 22a' of the mounting hole 22a, the shim 30 is rotated by utilizing the inward projections 36, 38 to engage the outward projection 34 with the annular groove 22b, as shown in FIG. 11. Here, since the protrusion amount of the outward projection 34 from the outer perimeter surface of the main body portion 32 is set so that the diameter d1 of the virtual circumscribing circle VCC will be the same size as the diameter d2 of the annular grooves 22b, 24b, it is necessary to move the outer perimeter portion 32b of the main body portion 32 that opposes the outward projection 34 across the center Co into the annular groove 22b, and the shim 30 is slid in the opposite direction of the projecting direction of the outward projection 34, accompanying the engagement of the outward projection 34 with the annular groove 22b. That is, the center Co of the outer circle of the main body portion 32 is displaced with respect to the center Cg of the annular groove 22b and the mounting hole 22a.

The displacement of the center Ci of the inner hole 32a with respect to the center Cg of the annular groove 22b and the mounting hole 22a is corrected, and the center Ci of the inner hole 32a is aligned with the center Cg of the annular groove 22b and the mounting hole 22a. As a result, it is possible to effectively suppress the displacement of the center Ci of the inner hole 32a with respect to the center Cg of the annular groove 22b and the mounting hole 22a after assembling the shim 30 to the annular groove 22b. It is thereby possible to successfully suppress a reduction in the contact area between the shim 30 and the input shaft 2. Additionally, it is necessary to move the outer perimeter portion 32b of the main body portion 32 that opposes the outward projection 34 across the center Co into the annular groove 22b, accompanying the engagement of the outward projection 34 with the annular groove 22b, and the outer perimeter portion 32b of the main body portion 32 will be engaged with the annular groove 22b; therefore, the shim 30 will be engaged with the annular groove 22b in at least two places in the circumferential direction.

Figure 12:
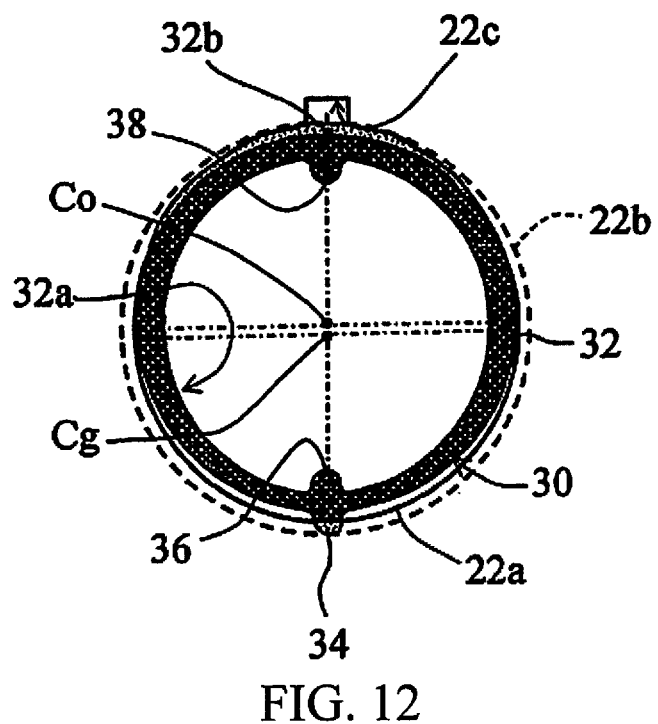
FIG. 12 is an explanatory view showing a state when the assembly of the shim 30 to the annular groove 22b is completed.

Then, when the outward projection 34 is rotated to a position that opposes the recessed groove 22c across the center Cg of the annular groove 22b and the mounting hole 22a, as shown in FIG. 12, that is, when the shim 30 is rotated 180 degrees, the assembly of the shim 30 to the annular groove 22b is completed. Additionally, it is possible to determine whether or not the shim 30 has been rotated 180 degrees by checking the circumferential position of the inward projections 36, 38.

By rotating the shim 30 180 degrees in this manner, the outward projection 34 is disposed in a position that is farther apart from the recessed groove 22c at a point in time in which the assembly of the shim 30 to the annular groove 22b is completed; therefore, it is possible to effectively suppress the outward projection 34 and the recessed groove 22c from being aligned due to an unintended rotation of the shim 30, causing the shim 30 to fall off from the mounting hole 22a, upon assembling the bearing B2 to the mounting hole 22a of the mounting portion 22.

Figure 13:
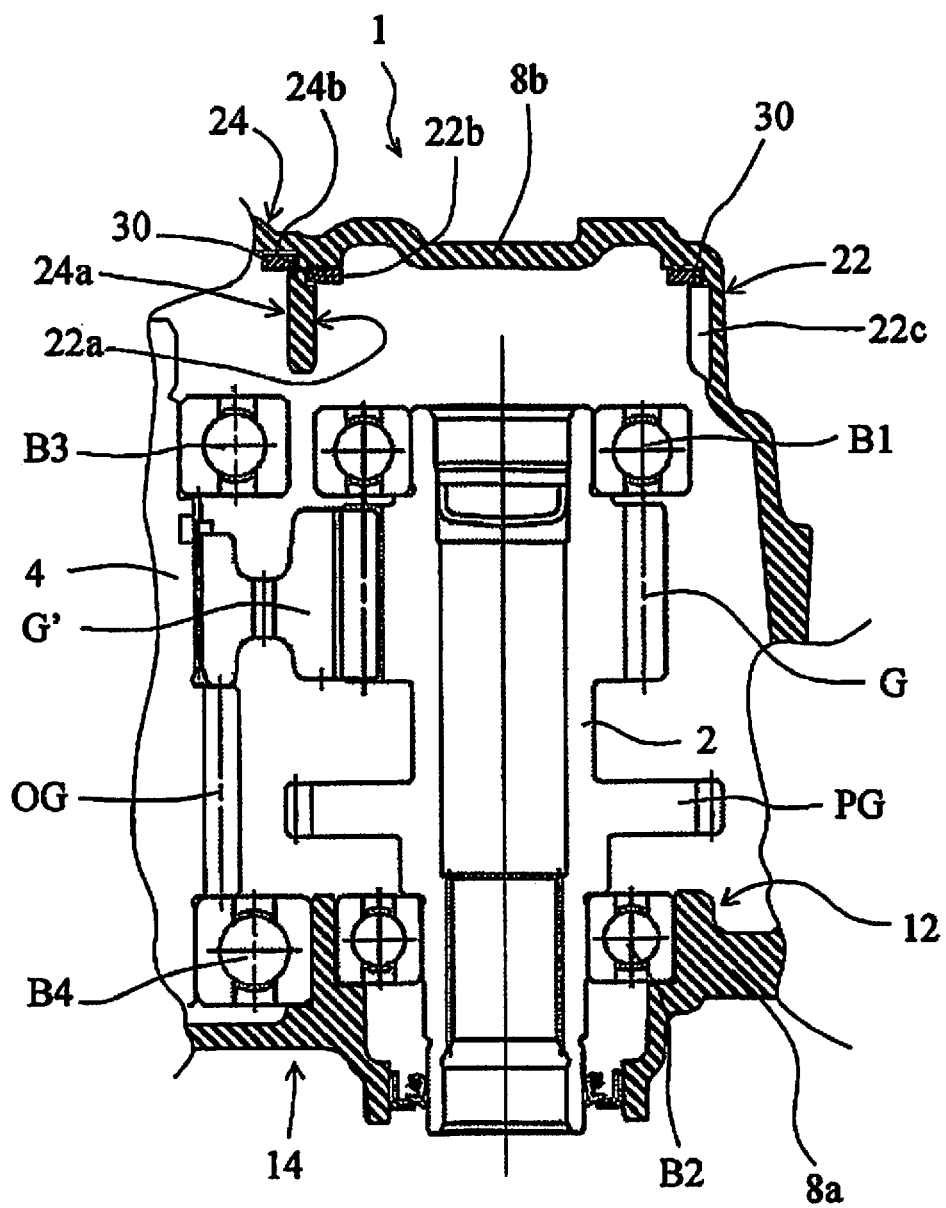
FIG. 13 is an explanatory view showing a state when assembling the case main body portion 8b to the housing unit 8a of the decelerator 1.

In the present embodiment, the assembly of the decelerator 1 is carried out by covering the case main body portion 8b, in which the shim 30 is assembled to the annular grooves 22b, 24b, from above the housing unit 8a in which the input shaft 2, the output shaft 4, and the differential 6 are installed (upward in FIG. 13), so that the opening of the case main body portion 8b faces vertically downward (downward in FIG. 13), as shown in FIG. 13.

At this time, the outward projection 34 of the shim 30 and the outer perimeter portion 32b of the main body portion 32 of the shim 30, which opposes the outward projection 34, is engaged with the annular grooves 22b, 24b, as shown in FIG. 12; therefore, the shim 30 will not fall off from the mounting holes 22a, 24a. The assembly properties of the decelerator 1 are thereby improved.

The present invention is configured to set the protrusion amount of the outward projection 34 from the outer perimeter surface of the main body portion 32 so that the diameter d1 of a virtual circumscribing circle VCC, which circumscribes the main body portion 32 and passes the projecting end of the outward projection 34 and a crossing point Pc between a virtual line VL and the outer perimeter surface of the main body portion 32, will be the same size as the diameter d2 of the annular grooves 22b, 24b, but the invention is not limited thereto. For example, the diameter d1 of the virtual circumscribing circle VCC may be configured to be less than or equal to the diameter d2 of the annular grooves 22b, 24b, and greater than or equal to the diameter of the mounting hole 22a.

The present invention is configured to include two inward projections 36, 38 to the inner hole 32a, but the invention is not limited thereto. For example, inward projections 36, 38 may not be provided. Further, the invention may be configured to include only one of the inward projections 36, 38. Furthermore, the invention may be configured to include three or more inward projections.

The present embodiment is configured to include the inward projection 36 in a position that corresponds to the outward projection 34 on the circumference of the inner hole 32a, and to include the inward projection 38 in a position with a phase that is shifted 180 degrees with respect to the position on the circumference of the inner hole 32a to which the inward projection 36 is disposed, but the arrangement positions of the inward projections 36, 38 may be configured to be disposed in any position on the circumference of the inner perimeter surface of the inner hole 32a.

The present embodiment is configured to be applied to a shim 30, which carries out an adjustment of the gap between the case main body portion 8b of the decelerator case 8 and bearings B1, B3 which rotatably supports the output shaft 4 and the input shaft 2 of the decelerator 1, but the invention may be applied to any location that is required to carry out an adjustment of a gap between two members.

The present embodiment is configured to include one recessed groove 22c and one outward projection 34, but a configuration such that a plurality of recessed grooves 22c and outward projections 34 may be employed as well. In this case, the number of outward projections 34 shall be configured to be less than or equal to the number of recessed grooves 22c.

In the present embodiment, the shim 30 is configured as an annular plate member, but the shim 30 may be a disc-shaped plate member as well. Further, when configuring the shim 30 as an annular plate member, the inner hole 32a may be other than a circular shape.

In the present embodiment, the recessed grooves 22c, 24c are configured as a lubricating groove for supplying lubricating oil that is stored in the decelerator case 8 to the lip portion of the oil seal OS2 and the shim 30, but the invention is not limited thereto. For example, the recessed grooves 22c, 24c may be configured as keyways, or configured as dedicated grooves for inserting the outward projection 34 of the shim 30.

The present embodiment illustrates one example of an embodiment to execute the present invention. Therefore, the present invention is not limited to the configuration of the present embodiment.

What is claimed is:

1. A gap adjustment member interposed between a first member having a mounting hole, an annular groove concentric with the mounting hole, having a diameter larger than a diameter of the mounting hole at a bottom portion of the mounting hole, and at least one recessed groove recessed toward a radially outward direction of the mounting hole and extending from an opening of the mounting hole to the annular groove, and a second member mounted to the mounting hole, the gap adjustment member inserted in the mounting hole and disposed in the annular groove, so as to adjust a gap between the first member and the second member, the gap adjustment member comprising:
    a main body portion having a diameter less than or equal to the diameter of the mounting hole; and
    at least one outward protrusion protruding radially outwardly on an outer perimeter surface of the main body portion, a number of the at least one outward protrusion being less than or equal to a number of the at least one recessed groove, and
    a diameter of a virtual circumscribing circle, which circumscribes the main body portion and passes a projecting end of the outward protrusion, and a crossing point, in which a virtual line that passes the projecting end and a center of the main body portion intersects the outer perimeter surface of the main body portion, and which is the crossing point on the opposite side of the projecting end, is greater than the diameter of the mounting hole and less than or equal to the diameter of the annular groove.

2. The gap adjustment member recited in claim 1, wherein the main body portion is a ring shape having an inner hole, and
    the inner hole has a center in a position that is shifted in the projecting direction of the outward protrusion with respect to the center of the main body portion.

3. The gap adjustment member recited in claim 2, wherein the diameter of the virtual circumscribing circle is equal to the diameter of the annular groove, and a displacement amount of the center of the inner hole with respect to the center of the main body portion is a same size as a displacement amount of the center of the virtual circumscribing circle with respect to a center of the annular groove, when the center of the main body portion and the center of the annular groove are aligned.

4. The gap adjustment member recited in claim 3, wherein the inner hole includes an inward protrusion protruding radially inwardly.

5. A method of assembling the gap adjustment member recited in claim 3, comprising:
    inserting the gap adjustment member in the mounting hole, in a state in which the outward protrusion is inserted in the recessed groove; and
    when the gap adjustment member reaches the annular groove, engaging the gap adjustment member with and assembling the gap adjustment member to the annular groove by rotating the gap adjustment member within the annular groove in the circumferential direction of the annular groove.

6. A transmission device comprising:
    a case;
    the second member that is an axle bearing member attached to the case;
    a rotational shaft that is rotatably supported by the case via the axle bearing member; and
    the gap adjustment member recited in claim 3, the gap adjustment member adjusting a gap between the case and the axle bearing member by assembling the gap adjustment member to the annular groove,
    the case including the mounting hole mounted to the axle bearing member, the annular groove coaxial with the mounting hole and having the diameter that is larger than the diameter of the mounting hole, at the bottom portion of the mounting hole, and the recessed groove that is recessed toward the radially outward direction of the mounting hole, and extending from the opening of the mounting hole to the annular groove.

7. The gap adjustment member recited in claim 2, wherein the inner hole includes an inward protrusion protruding radially inwardly.

8. The gap adjustment member recited in claim 7, wherein the inward protrusion is disposed on at least one of an inner perimeter surface of the inner hole corresponding to a first position on the outer perimeter surface of the main body portion to which the outward protrusion is disposed, and the inner perimeter surface of the inner hole corresponding to a second position on the outer perimeter surface of the main body portion, with a phase that is shifted 180 degrees with respect to the first position.

9. A method of assembling the gap adjustment member recited in claim 8, comprising:

inserting the gap adjustment member in the mounting hole, in a state in which the outward protrusion is inserted in the recessed groove; and when the gap adjustment member reaches the annular groove, engaging the gap adjustment member with and assembling the gap adjustment member to the annular groove by rotating the gap adjustment member within the annular groove in the circumferential direction of the annular groove.

10. A transmission device comprising:
a case;
the second member that is an axle bearing member attached to the case;
a rotational shaft that is rotatably supported by the case via the axle bearing member; and
the gap adjustment member recited in claim 8, the gap adjustment member adjusting a gap between the case and the axle bearing member by assembling the gap adjustment member to the annular groove,
the case including the mounting hole mounted to the axle bearing member, the annular groove coaxial with the mounting hole and having the diameter that is larger than the diameter of the mounting hole, at the bottom portion of the mounting hole, and the recessed groove that is recessed toward the radially outward direction of the mounting hole, and extending from the opening of the mounting hole to the annular groove.

11. A method of assembling the gap adjustment member recited in claim 7, comprising:
inserting the gap adjustment member in the mounting hole, in a state in which the outward protrusion is inserted in the recessed groove; and
 when the gap adjustment member reaches the annular groove, engaging the gap adjustment member with and assembling the gap adjustment member to the annular groove by rotating the gap adjustment member within the annular groove in the circumferential direction of the annular groove.

12. A transmission device comprising:
a case;
the second member that is an axle bearing member attached to the case;
a rotational shaft that is rotatably supported by the case via the axle bearing member; and
the gap adjustment member recited in claim 7, the gap adjustment member adjusting a gap between the case and the axle bearing member by assembling the gap adjustment member to the annular groove,
the case including the mounting hole mounted to the axle bearing member, the annular groove coaxial with the mounting hole and having the diameter that is larger than the diameter of the mounting hole, at the bottom portion of the mounting hole, and the recessed groove that is recessed toward the radially outward direction of the mounting hole, and extending from the opening of the mounting hole to the annular groove.

13. A method of assembling the gap adjustment member recited in claim 2, comprising:
inserting the gap adjustment member in the mounting hole, in a state in which the outward protrusion is inserted in the recessed groove; and
 when the gap adjustment member reaches the annular groove, engaging the gap adjustment member with and assembling the gap adjustment member to the annular groove by rotating the gap adjustment member within the annular groove in the circumferential direction of the annular groove.

14. A transmission device comprising:
a case;
the second member that is an axle bearing member attached to the case;
a rotational shaft that is rotatably supported by the case via the axle bearing member; and
the gap adjustment member recited in claim 2, the gap adjustment member adjusting a gap between the case and the axle bearing member by assembling the gap adjustment member to the annular groove,
the case including the mounting hole mounted to the axle bearing member, the annular groove coaxial with the mounting hole and having the diameter that is larger than the diameter of the mounting hole, at the bottom portion of the mounting hole, and the recessed groove that is recessed toward the radially outward direction of the mounting hole, and extending from the opening of the mounting hole to the annular groove.

15. A method to assemble the gap adjustment member recited in claim 1, comprising:
inserting the gap adjustment member in the mounting hole, in a state in which the outward protrusion is inserted in the recessed groove; and
 when the gap adjustment member reaches the annular groove, engaging the gap adjustment member with and assembling the gap adjustment member to the annular groove by rotating the gap adjustment member within the annular groove in the circumferential direction of the annular groove.

16. The method of assembling a gap adjustment member recited in claim 15, wherein
 the gap adjustment member is rotated within the annular groove until the outward protrusion is disposed in a position with a phase that is shifted 180 degrees from the position to which the recessed groove is disposed.

17. A transmission device comprising:
a case;
the second member that is an axle bearing member attached to the case;
a rotational shaft that is rotatably supported by the case via the axle bearing member; and
the gap adjustment member recited in claim 1, the gap adjustment member adjusting a gap between the case and the axle bearing member by assembling the gap adjustment member to the annular groove,
the case including the mounting hole mounted to the axle bearing member, the annular groove coaxial with the mounting hole and having the diameter that is larger than the diameter of the mounting hole, at the bottom portion of the mounting hole, and the recessed groove that is recessed toward the radially outward direction of the mounting hole, and extending from the opening of the mounting hole to the annular groove.

18. The transmission device recited in claim 17, wherein the recessed groove is configured as a lubricating oil passage to supply lubricating oil between the axle bearing member and the case.

\* \* \* \* \*